Oct. 26, 1954  J. H. GRUVER  2,692,555
RIBBON INKING MEANS FOR SALES SLIP IMPRINTING MACHINES
Filed Aug. 24, 1949  9 Sheets-Sheet 2

Inventor
John H. Gruver
By Wallace and Cannon
Attorneys

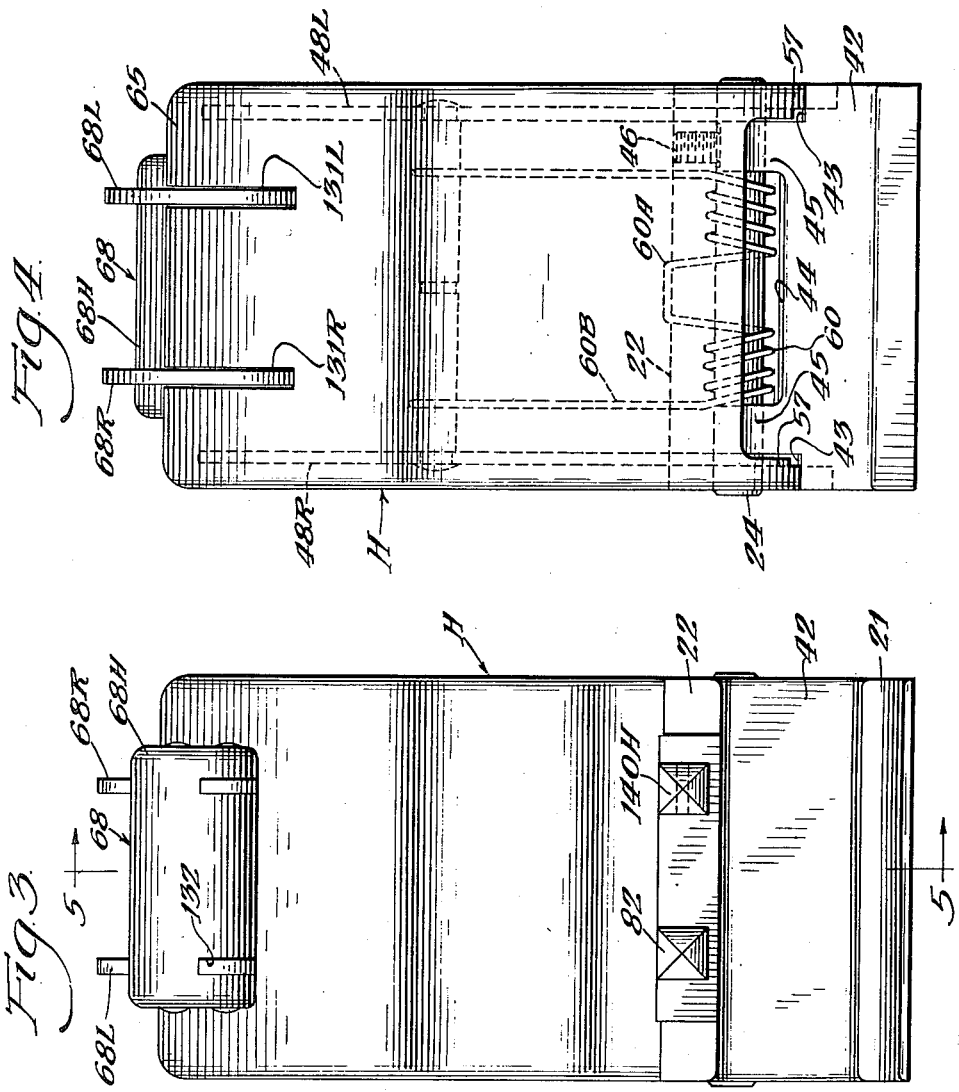

Oct. 26, 1954  J. H. GRUVER  2,692,555
RIBBON INKING MEANS FOR SALES SLIP IMPRINTING MACHINES
Filed Aug. 24, 1949  9 Sheets-Sheet 4

Inventor:
John H. Gruver
By: Wallace and Cannon
Attorneys

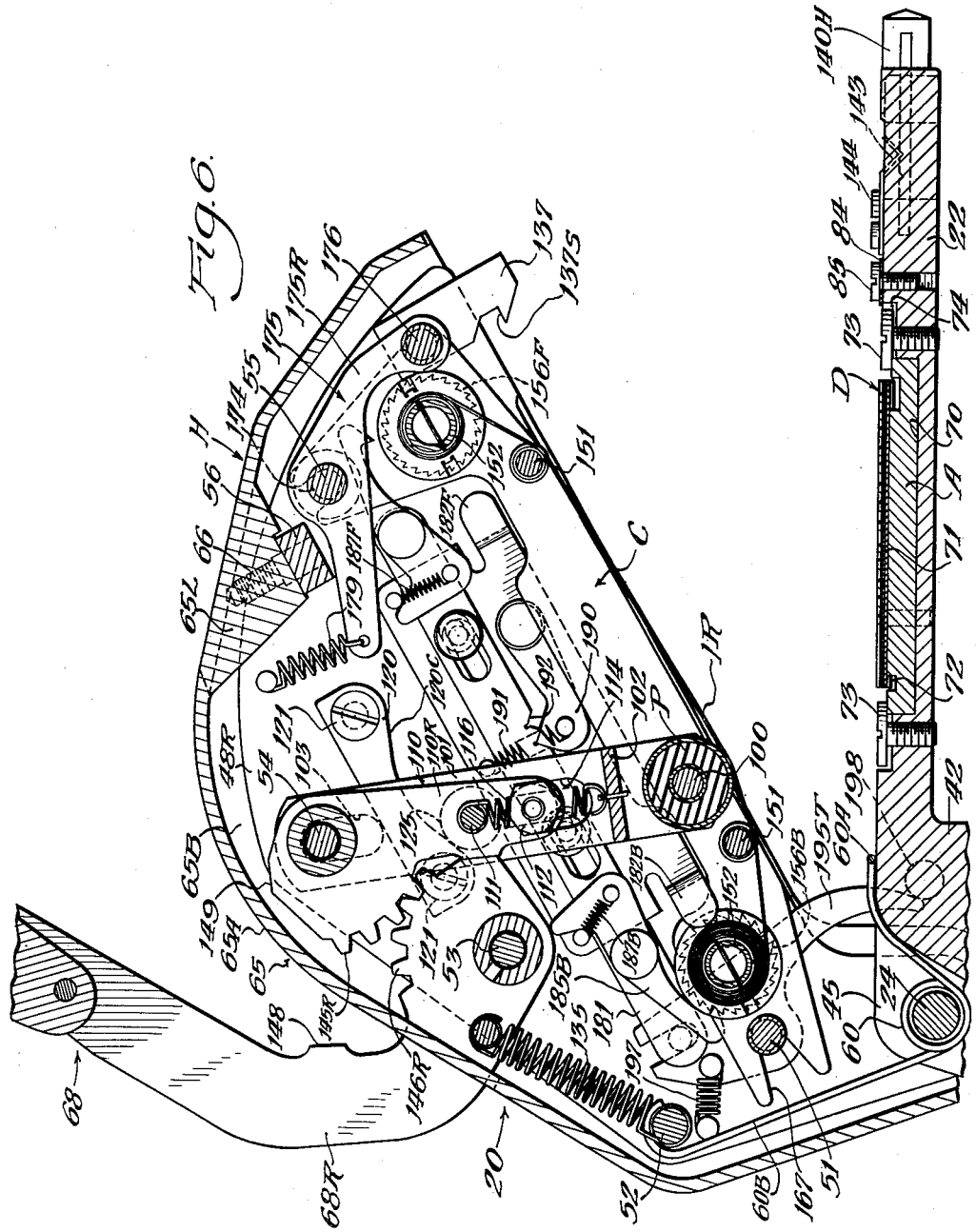

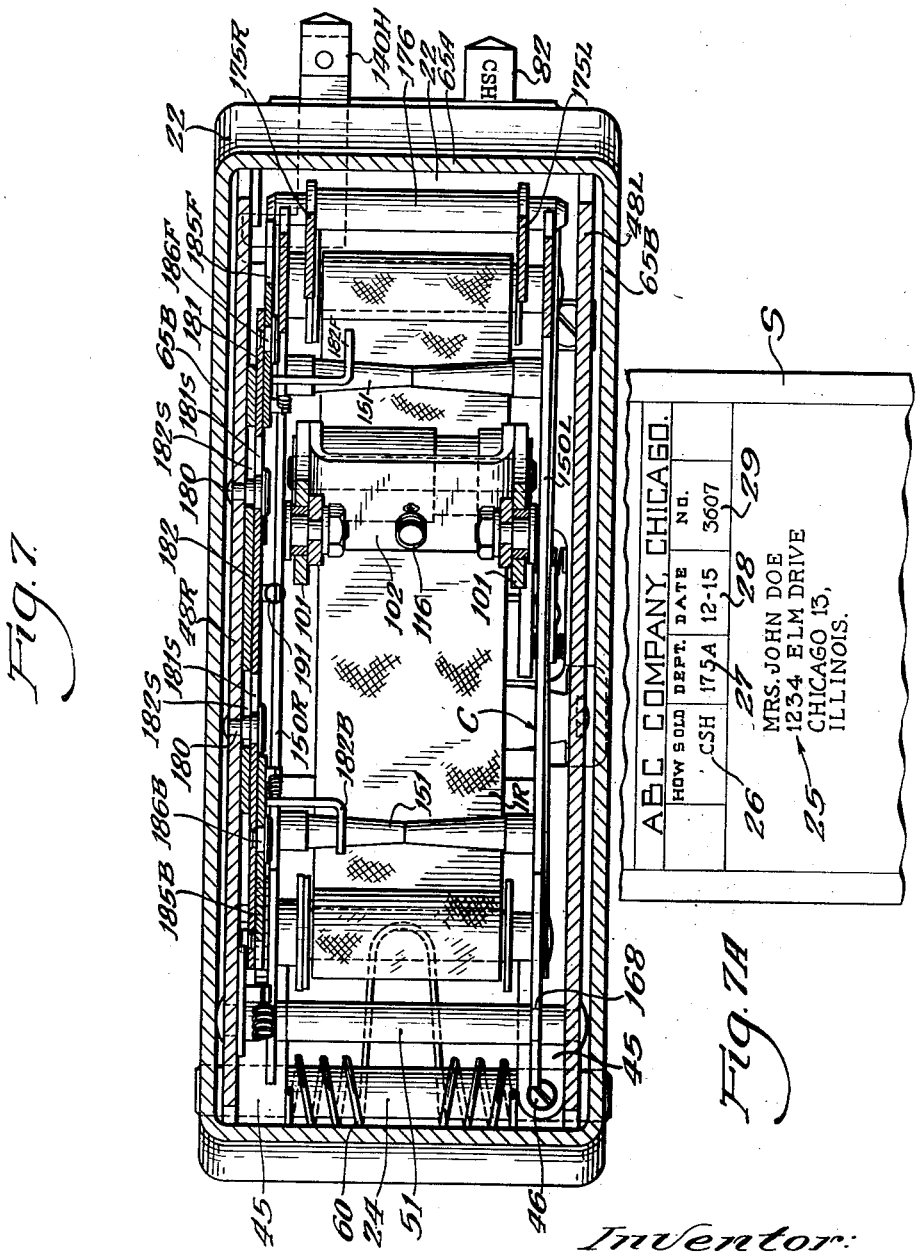

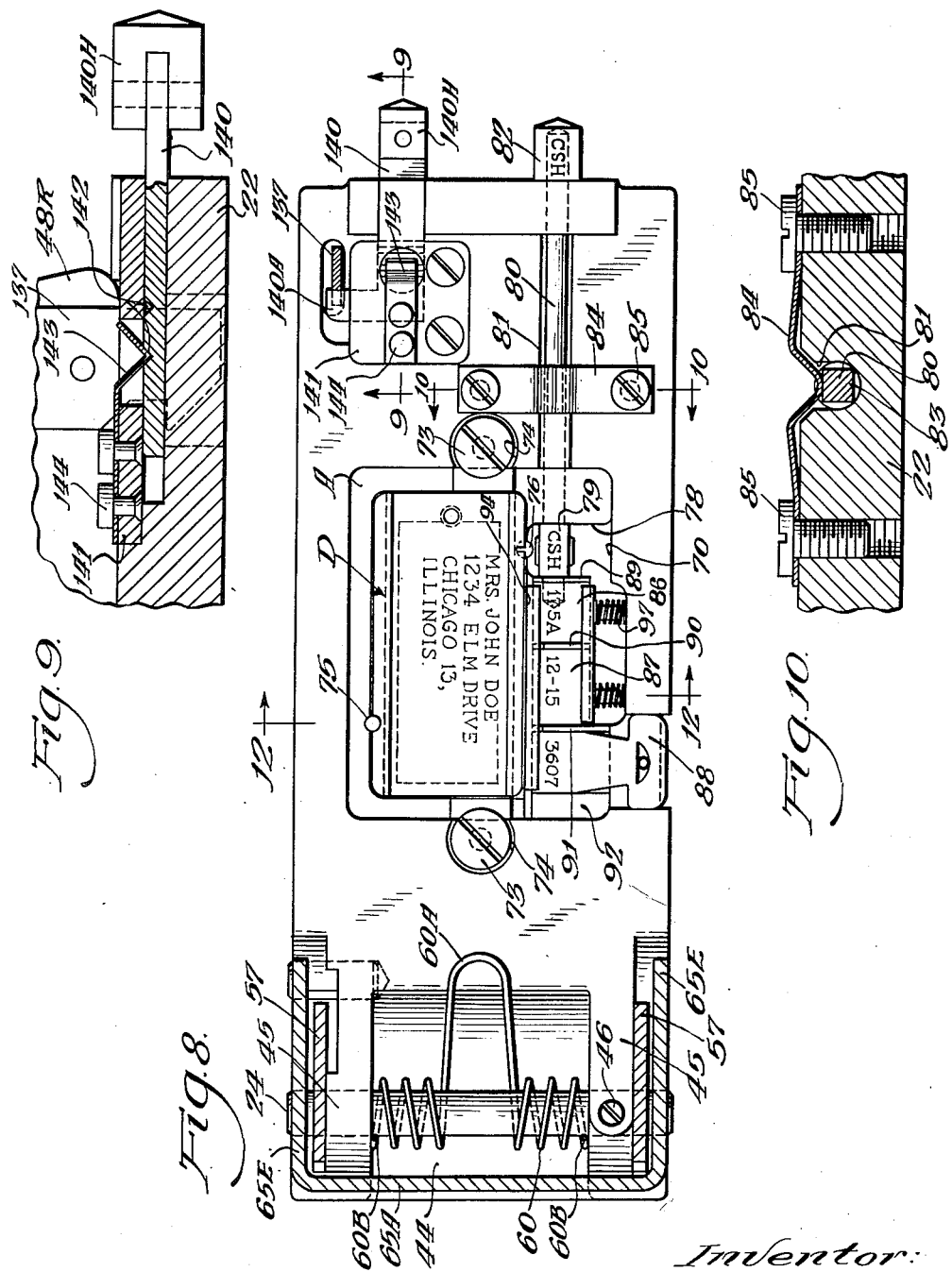

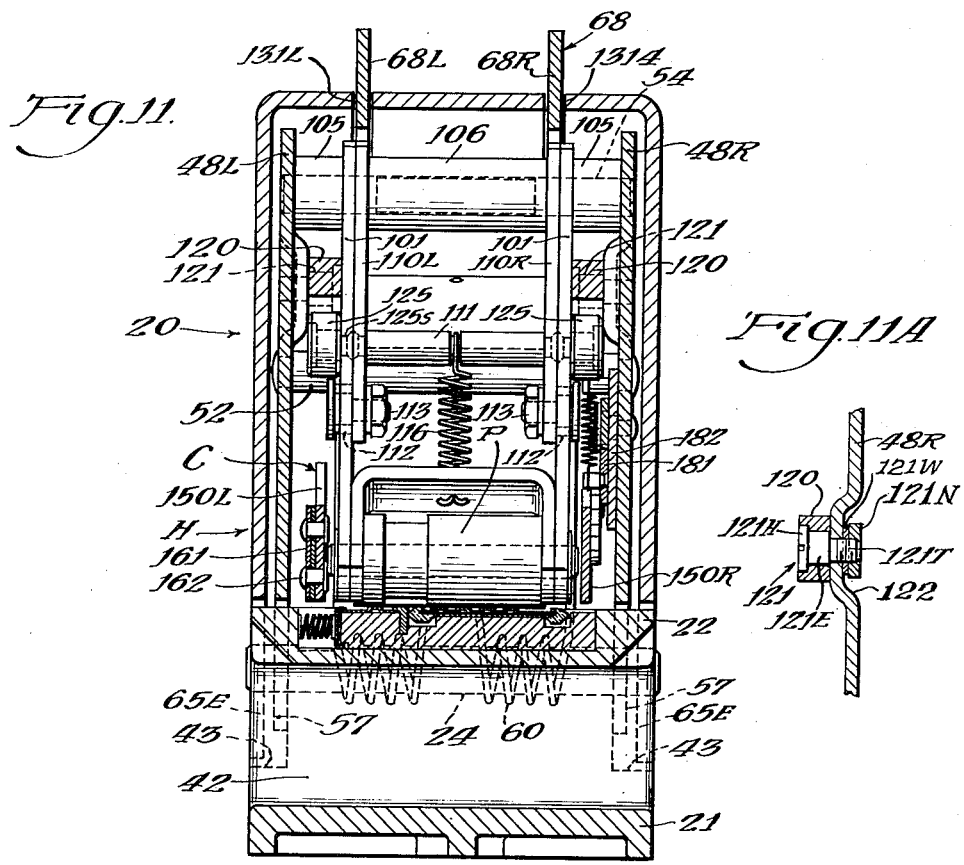
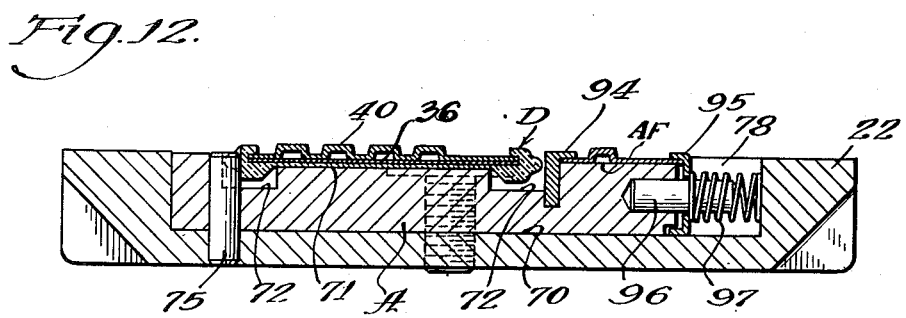

Oct. 26, 1954  J. H. GRUVER  2,692,555
RIBBON INKING MEANS FOR SALES SLIP IMPRINTING MACHINES
Filed Aug. 24, 1949
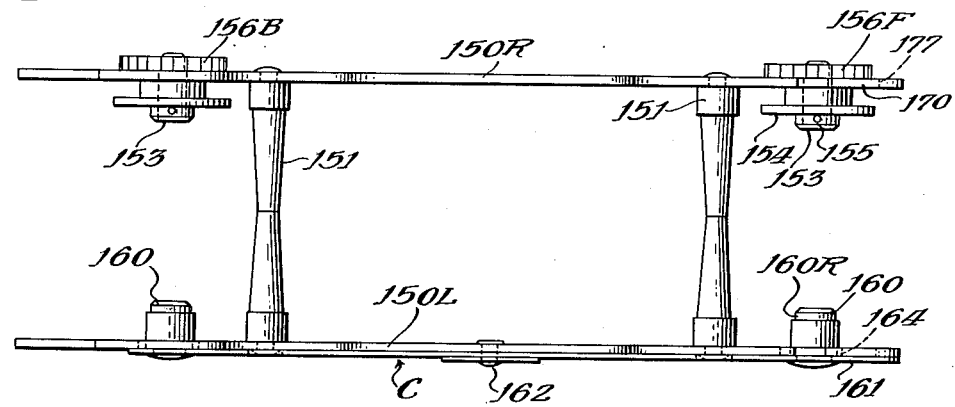
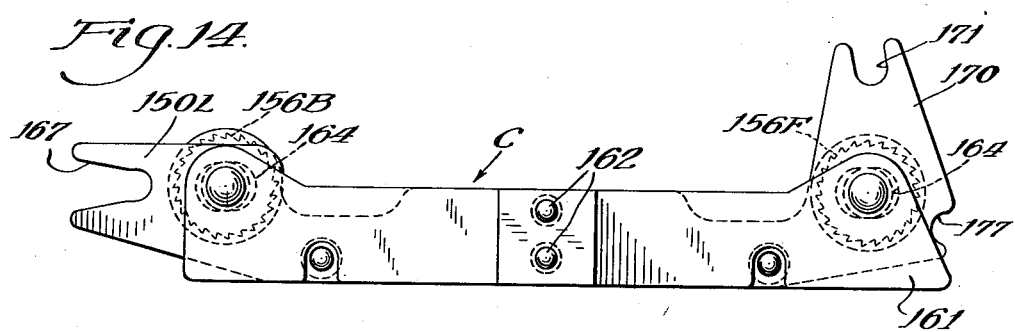
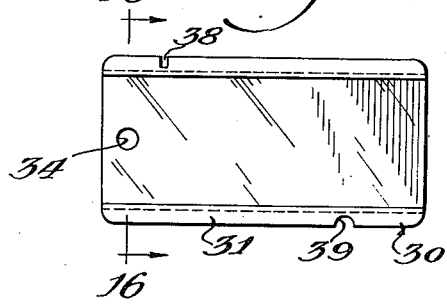
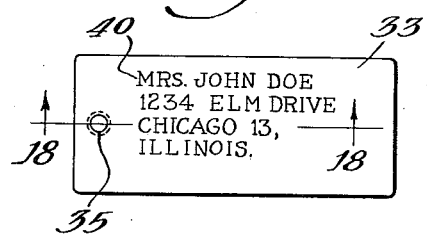
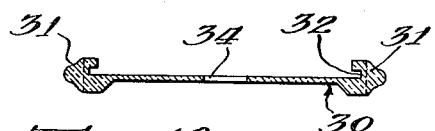
Inventor:
John H. Gruver
By: Wallace and Cannon
Attorney Patented Oct. 26, 1954

2,692,555

UNITED STATES PATENT OFFICE 2,692,555

RIBBON INKING MEANS FOR SALES SLIP IMPRINTING MACHINES

John H. Gruver, Cleveland Heights, Ohio, assignor to Addressograph - Multigraph Corporation, Wilmington, Del., a corporation of Delaware Application August 24, 1949, Serial No. 111,992

12 Claims. (Cl. 101—336)

This invention relates to printing machines and particularly to printing machines adapted for making printed impressions on sales slips, or the like, in department stores, particularly where such impressions include the name, address and other identifying data relating to a customer.

In sales printing machines of the kind that have heretofore been used it has been customary to employ an elevated support plate upon which an individual customer's charge plate might be positioned for making a printed impression from the charge plate onto the sales slip and in such prior machines it has been customary to have a shiftable printing head mounted for movement into a printing position over a sales slip, or the like, to produce the desired printed impression from a charge plate mounted on the supporting platform. Such prior printing machines have been relatively complicated in structure and have been relatively difficult to maintain, particularly insofar as replacement of the inked ribbon may be concerned, and the important object of the present invention is to eliminate such difficulties and such relatively complicated structure.

Further important objects of the present invention are to simplify the operation in use of printed machines of the aforesaid character and to enable improved printed impressions to be made with such printing machines.

Another important object of the present invention is to simplify the way in which the ribbon feed mechanism in such machines is actuated and to enable the inked ribbon in such machines to be quickly and easily removed and replaced. More specifically, it is the object of the present invention to enable the inked ribbon in such a machine to be mounted upon a removable ribbon carrier so that such ribbon carrier may be readily removed and may be replaced upon a different ribbon carrier so that the task of replacing the ribbon in such a machine may be quickly and easily accomplished.

In machines of the aforesaid character it is customary to produce the printed impression through the cooperation of a resilient platen roller that is moved across the upper surface of the inked ribbon so as to force the inked ribbon and the sheet upon which the impression is to be made downwardly into printing cooperation with the charge plate that is in position on the platform of the machine, and it is further an important object of the present invention to enable the printing forces applied by the platen roller to be accurately controlled so as to thereby insure an even and neat printed impression. More specifically, it is the object of the present invention to afford a guide means for the platen rollers that are of a simple character, to enable the curved cam surfaces to be utilized for obtaining a straight line path for the travel of the platen roller.

In the sales slip imprinting machine as heretofore constructed, the relative position of the anvil has been quite critical since this anvil must in such prior machines occupy a level or parallel position in respect to the path of the movement of the platen roller, and this requirement has in prior machines made it necessary to afford relatively elaborate adjusting mechanisms for leveling the anvil. In view of this it is further an important object of the present invention to simplify the mounting of the anvil in such sales slip imprinting machines, and a more specific object is to afford a stationary mounting for the anvil in fixed relationship with respect to the supporting platform to enable desired relationship between the platen roller and the anvil to be attained through the adjustment of guide means that are afforded in the printing head of the machine.

Other and further objects of the present invention will be apparent from the following description and claims and are illustrated in the accompanying drawings which, by way of illustration, show preferred embodiments and the principles thereof, and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 3 is an end elevational view taken from the left in Fig. 1;

Fig. 4 is an end elevational view taken from the right in Fig. 1;

Fig. 6 is a view similar to Fig. 5 and showing the printing head in elevated or inactive position;

Fig. 7 is a plan sectional view taken substantially along the line 7—7 of Fig. 5;

Fig. 7A is a face view of a portion of the sales slip imprinted through the use of the machine of the present invention;

Fig. 8 is a plan sectional view showing the upper face of the platform of the machine and taken substantially along line 8—8 of Fig. 5;

Fig. 9 is a fragmentary vertical sectional view shown on an enlarged scale and taken substantially along the line 9—9 of Fig. 8;

Fig. 10 is a fragmentary vertical sectional view taken on an enlarged scale and substantially along the line 10—10 of Fig. 8;

Fig. 11 is a vertical sectional view taken substantially along the line 11—11 of Fig. 5;

Fig. 11A is a sectional view of a part of the structure shown in Fig. 11;

Fig. 12 is a vertical sectional view on an enlarged scale and taken substantially along line 12—12 of Fig. 8;

Fig. 13 is a plan view of the removable ribbon supporting carrier;

Fig. 14 is a side elevational view of the ribbon carrier;

Fig. 15 is a plan view of a charge plate holder that may be utilized in association with the machine of the present invention;

Fig. 16 is an enlarged cross-sectional view taken along line 16—16 of Fig. 15;

Fig. 17 is a face view of an embossed printing plate adapted to be placed in position in the holder of Fig. 15; and Fig. 18 is a fragmentary cross-sectional view taken substantially along the line 18—18 of Fig. 17 and showing a signature card in association with the printing plate.

Figure 1:
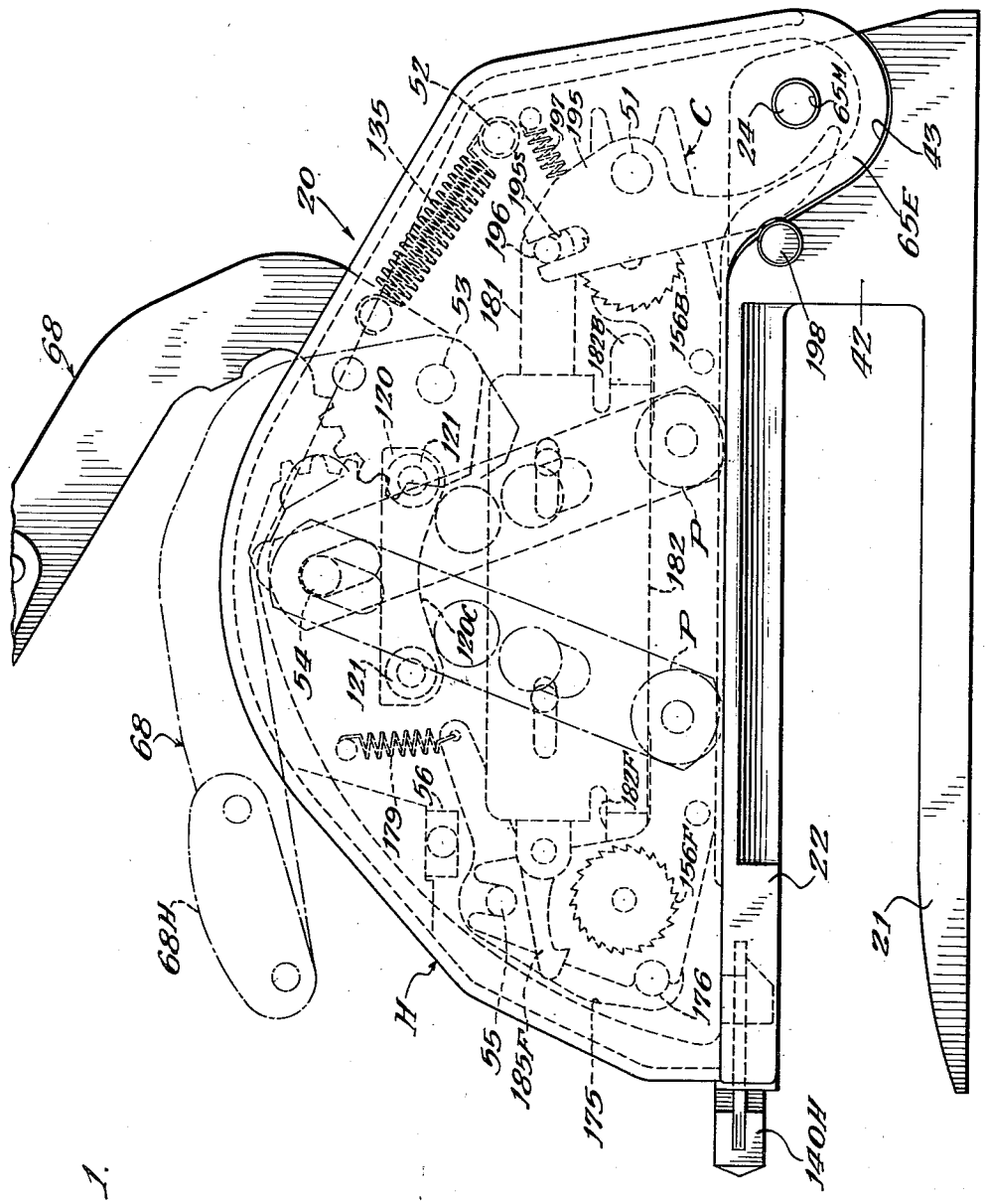
Fig. 1 is a side elevational view of the sales slip imprinting machine embodying the features of this invention, the printing head being shown in its lower or operative position.

For purposes of disclosure, the invention is herein illustrated as embodied in a sales slip imprinting machine 20, having a base 21 adapted for mounting on a counter or the like in a department store, and with an elevated horizontal platform 22 upon which a sales slip, such as the sales slip S that is fragmentarily shown in Fig. 7A, may be mounted for the performance of the printing operation by impression means that are included within a shiftably mounted printing head H that is carried on a pivotal axis afforded by shaft 24 that is disposed across the rear end of the base structure. The sales slip S may, of course, constitute a single sheet, or may constitute a series of sheets with carbon paper inserts or the like in accordance with the usual practice, and upon this sales slip S, a printed impression 25 is adapted to be made showing the name and address of the person to whom certain merchandise is to be charged, and this sales slip is also adapted to receive supplemental impressions which in the present instance include an impression 26 which shows the character of the transaction, that is, whether it is a cash, credit or C. O. D. transaction. An additional supplemental impression 27 is also included showing the department number in which the sale has been made, while a supplemental impression 28 shows the date upon which the sale was made. A further supplemental impression 29 shows the identifying number of the clerk who has made the sale.

The identifying impression 25 is made from a charge plate or printing plate D that is shown in assembled form in Figs. 8 and 12 of the drawings and which is illustrated in its component parts in Figs. 15 to 18, inclusive, of the drawings. This charge plate D comprises a carrier 30 made from a transparent plastic material and of generally rectangular form and which has relatively wide and thick edge portions 31. Along their upper faces, the edge portions 31 are undercut as at 32 to afford a pair of opposed longitudinal grooves into which an embossed metallic printing plate 33 may be inserted with an endwise motion. The carrier 30 has an opening 34 formed therein near one of its ends, and a complemental projection 35 is formed on the printing plate 33 so that when the printing plate 33 has been fully inserted into the grooves 32 the projection 35 will enter the opening 34 due to resiliency of the parts, and by such entry, the printing plate 33 will be locked against undesired endwise displacement with respect to the carrier 30.

As will be evident in Figs. 12 and 18 of the drawings, the charge plate D also embodies an identifying or signature card 36 which is adapted to underlie the printing plate 33, and this card 36 has an opening 37 therein which corresponds in size and location with the opening 34, and hence when the printing plate 33 and the card 36 are in position in the carrier, the projection 35 extends through the opening 37 so as to thereby hold the card 36 in place. The identifying information on the card 36 is carried on what may be termed the lower face thereof so that such information will be visible through the transparent wall of the carrier 30.

Along its opposite edges 31, the frame 30 has a pair of notches 38 and 39 which by their form and location along such edges are arranged to serve as an identification of the department store at which the use of this particular charge plate is authorized, and it will be recognized that such notches may be placed at several different positions along such edges where the use of the charge plate in a number of different stores is authorized.

The embossed printing plate 33 has type characters 40 formed thereon by embossing so as to be capable of use to produce the identifying impression 25 on the sales slip S. The means that are included in the machine 20 for producing the supplemental impressions 26, 27, 28 and 29 will be described hereinafter in relation to their location and mounting in the machine.

The base 21 of the machine and the platform 22 are in the present instance afforded by a single or unitary casting, the base 21 and the platform 22 being joined by relatively heavy column 42 that is extended upwardly from the base 21 adjacent its rear end, or, in other words, at the right-hand end as viewed in Fig. 1. The column 42 has the rearmost upper corner thereof cut away as shown at 43 and 44, thereby to afford a pair of laterally spaced and upwardly and rearwardly projecting lugs 45 that serve to receive the pivot shaft 24, and it will be noted that between these two lugs 45, the cut away portion 44 affords clearance space for mounting of certain elements of the machine, as will hereinafter be described. The shaft 24 is held in place by a set screw 46 as shown in Figs. 4 and 8.

Figure 5:
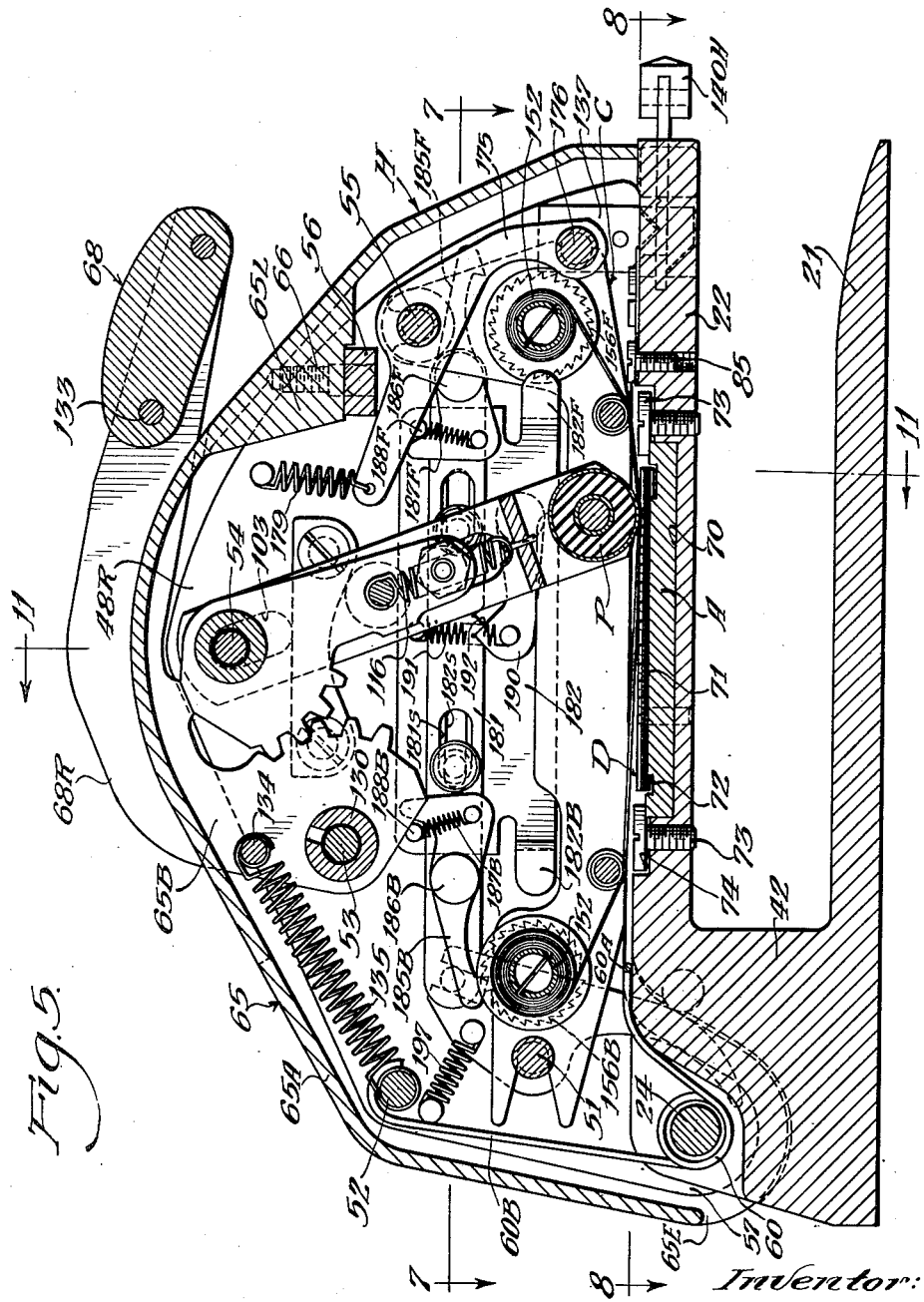
Fig. 5 is a longitudinal vertical sectional view taken substantially along the line 5—5 of Fig. 3.

The printing head H is afforded by a pair of side plates 48R and 48L which are connected by a series of connecting cross rods 51, 52, 53, 54 and 55, and by a rectangular cross bar 56, all of which are shown in Fig. 5 of the drawings. The side plates 48R and 48L are thus rigidly related and are so spaced that they are adapted to be positioned just inwardly of the side edges of the platform 22. The lower edges of these side plates 48L and 48R are relatively flat throughout the major portion of the length of such plates, but at the rear ends thereof the side plates have downwardly projecting ears 57 which are disposed just outwardly of the lugs 45, as will be evident in Figs. 4, 7 and 8 of the drawings. Thus, when the ears 57 have been put in this position, the pivot shaft 24 may be put in place so that the projecting ends thereof extend through the ears 57 to afford a pivotal support for the printing head H.

The pivot shaft 24 serves as a mounting for a coiled torsion spring 60, this torsion spring having two coils that are connected by an intermediate radial arm 60A that projects forwardly and upwardly so as to overlie the rear portion of the platform 22. At the opposite ends of the two coils of the torsion spring 60, upwardly extending arms 60B are provided, and at their upper ends, these arms 60B are hooked about the transverse connecting shaft 52. The torsion spring 60 is disposed between the mounting lugs 45, and the arrangement of the arms 60A and 60B thereof is such as to normally urge the printing head H to the elevated or retracted position of Fig. 6 of the drawings.

The frame that is thus afforded by the connected side plates 48R and 48L is housed and concealed by a casing 65 that has integral top and end walls 65A and side walls 65B. At the rear end of the casing 65 the side walls 65B are extended downwardly to afford ears 65E that extend downwardly into the cut out portions 43 and which have openings 65M formed therein so that the ends of the pivot shaft 24 may extend into such openings and afford a mounting for the rear end of the casing 65. The forward portion of the casing 65 is connected to the side plates 48R and 48L by anchoring this forward portion to cross the bar 56, as shown in Fig. 5 of the drawings, and for this purpose an enlarged internal lug 65L is formed within the casing as a projection downwardly and rearwardly from the top wall 65A, and a connecting screw 66 is extended upwardly through the bar 56 and is threaded into the lug 65L so as to thereby complete mounting of casing 65 for the movement with the frame that is afforded by the side plates 48R and 48L.

Within the printing head H and adjacent to what may be termed the lower edge or face thereof, a resilient platen roller P is mounted for movement across the upper face of the charge plate D that is mounted on the platform 22, and an operating handle 68 is mounted on the head H so as to project upwardly and forwardly therefrom, and this handle 68 is operatively associated with the platen roller P, as will hereinafter be described, so that the handle 68 may be utilized initially to move the printing head H downwardly from within the retracted position of Fig. 6 to the lower or operating position shown in Fig. 1 and so as to be operative in further actuation of the handle 68 to effect movement of the platen roller P through the desired printing stroke.

In accordance with the present invention, the charge plate D is supported on the platform 22 by an anvil A that is mounted in a fixed position on the platform 22. Thus, as shown in Figs. 5, 6, 9, 11 and 12, the upper face of the platform 22 has a relatively large recess 70 formed therein and the anvil A is seated within the recess 70 so as to engage all four side walls of the recess and thereby be positioned in a lateral sense. The upper face of the anvil is formed with an upper surface 71 that has a groove 72 formed therein as will be evident in Figs. 5 and 12, and the groove 72 is arranged and adapted to receive downward projections that may be formed about the edge of the printing devices D, such as are formed in the present instance by the relatively thick edges 31 of the carrier of such printing devices. The area that is enclosed by the groove 72 affords a supporting surface which engages the bottom of the carrier of the printing device between the downwardly extending portions afforded by the edges 31. The anvil A is held in place under the present invention by means of an extremely simple character, and, as herein shown, such means are afforded by a pair of cap screws 73 that are threaded downwardly into the platform 22 with their heads in a protected position within the recess 74, as will be evident in Figs. 5 and 8. The location of the cap screws 73 is such that the edge of the head of each screw extends over the adjacent edge of the anvil A, and the screws 73 may thus be tightened to hold the anvil firmly in a downward direction and in a fixed position in the recess 70.

For cooperation with the notch 39 in a plate, a cylindrical pin 75 is extended downwardly through the anvil A and the underlying portion of the platform 22, and the location of this pin is, of course, determined by the particular store or other identifying characteristic that is to apply to the particular machine. Similarly, a pin 76 of a different form is mounted in a substantially similar manner in the anvil A adjacent to the other edge of the anvil and this pin is formed for cooperation with the notch 38.

The anvil A also functions in attaining a proper mounting for the printing elements that are to be effective in producing the printed supplementary impressions 26, 27, 28 and 29.

Thus, the anvil A has a portion thereof cut away as at 78, as will be evident in Fig. 8 of the drawings, and this space is utilized to receive a settable type member 79 that is utilized to produce the supplemental impression 26. The type member 79 in the present instance is of a generally square cross section and is carried within the cutout portion 78 on a rotatable horizontal shaft 80. This rotatable shaft extends through a mounting groove 81 that is formed in the platform 22 so that the forward end of the shaft 80 is positioned in an exposed position in the forward end of the platform, and a setting or adjusting head 82 is fixed on the shaft 80 so that the shaft may be set in any one of the four positions wherein different sets of type characters will be disposed on an upwardly facing relation and in a printing plane that is common with the type characters 40 of a charge plate D that may be disposed on the anvil A. To enable such adjustment of the type head 79 to be attained, the shaft 80 is rotatably supported in bearings that are afforded in the body of anvil A. Somewhat to the right of the anvil A, the shaft 80 is provided with a squared portion 83, as will be evident in Fig. 10, and this squared portion is engaged by a generally flat spring member 84 that is held in place by a pair of screws 85 as shown in Fig. 10. Thus the type head 79 is accurately held in any one of its four different positions to which it may be set by the operator.

In the portion of the anvil that is disposed between the location of the type head 79 and the left-hand end of the anvil, as shown in Fig. 8, means are afforded for removably mounting a department number plate 86, a date plate 87, and the clerk's key 88. To this end, the upper surface of the anvil is formed as at AF, Fig. 12, so that when the plates 86, 87 and 88 are in position, the type characters thereof will be disposed in the proper printing plane, and to attain proper lateral location of these elements, relatively low positioning ribs 89, 90, 91 and 92 are provided that extend slightly above the supporting surface AF. The edges of the elements 86, 87 and 88 that are adjacent to the charge plate D are arranged to extend under the horizontal flange of an angle member 94 that is secured in a fixed relation in anvil A. In the present instance, this is attained by locating the downwardly extending flange of angle 94 along the adjacent side face of the groove 72. The other edges of the plates 86 and 87 are held in position by a retaining member 95 that is best shown in Figs. 8 and 12 of the drawings. This retaining member is in the present instance in the form of a channel having one flange riding on the bottom of the recess 70 and having its other flange adapted to move into position over the adjacent edges of the plates 86 and 87 as shown in Figs. 8 and 12. The anvil A has a pair of guide pins 96 fixed therein as shown in Figs. 8 and 12 and these pins extend through openings in the web of the channel 95 to effectually guide the channel in retractive movements when it is desired to remove and replace one of the plates 86 or 87. The channel or retaining member 95 is, however, resiliently urged toward the effective position in which it is shown in Fig. 12, and this is attained in the present instance by expansive coil springs 97 that surround the projecting ends of the guide pins 96 and which act between the retaining channel 95 and the opposed side wall of the recess 70.

With respect to the clerk's key 88, the key is, of course, guided laterally and is accurately positioned by the ribs 91 and 92, and when the key 88 is fully inserted it has its inner end positioned beneath the retaining angle 94.

The platen roller P is arranged in its printing movements to ride along the upper surface of an inked ribbon IR that is supported and guided under the present invention in a removable and readily replaceable ribbon supporting carrier C, and the details of structure of the ribbon carrier C will be described in detail hereinafter. The platen roller P is carried on a shaft 100 that extends between the lower end portions of a pair of arms 101, such arms being connected just above the platen roller P by a rigid connecting bar 102. At their upper ends, the arms 101 have elongated longitudinal slots 103 formed therein as will be evident in Figs. 5 and 6 of the drawings. The arms 101 are so located as to be disposed in substantially spaced relationship with respect to the inner surfaces of the side plates 48R and 48L, thereby to afford clearance space for certain operative mechanisms between the arms 101 and the side plates as will hereinafter be described. The slots 103 are disposed so that the connecting shaft 54 may be extended therethrough, and thus the arms 101 may be pivoted about this shaft 54 and the arms may be moved longitudinally throughout the range that is determined by the length of the slots 103. The shaft 54 is removably positioned in the side plates 48L and 48R, and a plurality of spacing sleeves 105 and 106 are provided on the shaft 54 to properly locate the arms 101 and other elements, as will hereinafter be described.

The arms 101 are adapted to be moved through rocking movements from the position shown in Fig. 6 to the position shown in Fig. 5, and the arms are actuated through such movements by a rocker structure 110 that comprises a pair of arms 110R and 110L that are rigidly connected by a cross shaft 111 as will be evident in Fig. 11 of the drawings. The arms 110R and 110L are so spaced as to be disposed immediately inside of the respective arms 101, and the arms 110R and 110L are pivoted on the shaft 54. Thus the rocker structure 110 may be rocked about the axis of the shaft 54, and such rocking movements are imparted to the arms 101 by means of rollers 112 that are fixed on the lower ends of the arms 110R and 110L by means including studs 113, and which rollers 112 are disposed on the outer sides of the arms 110R and 110L so as to ride in elongated slots 114 that are provided in the arms 101, as will be evident in Figs. 7 and 11. Thus, in the rocking movements of the rocker 110, corresponding rocking movements are imparted to arms 101, and during such rocking movements arms 101 may move longitudinally so as to enable the platen roller P to move along a straight path.

Under and in accordance with the present invention, this straight path of movement for the platen roller P is attained by means that also enable the relationship between the platen roller P and the printing plane to be adjusted without the adjustment of the anvil A. Thus, the platen roller P is constantly urged in an upward direction by a spring 116 that is connected between the cross bar 102 and the shaft 111 of the rocker 110, and such upward movement of the platen roller P is governed by a pair of adjustable cam elements 120 that are fixed on the inner surfaces of the respective side plates 48R and 48L. The mounting of the cam plates 120 is attained in each instance by a pair of adjustably mounted eccentric screw elements 121 that are extended through the cam plates and through the side plates. Each of these screw elements 121 has a slotted head portion 121H, and a relatively large eccentric portion 121E disposed within the related cam element 120 and a threaded portion 121T on the screw element 121 extends through an opening in the related side plate, and has a lock washer 121W and a nut 121N thereon for securing the screw in any desired adjusted position. The screws 121 are in the present instance located concentrically with inwardly extended embossures 122 which afford clearance space for the nuts 121N while at the same time locating the cams 120 in more advantageous positions. Thus, it will be clear that by rotative adjustment of a screw element 121 the vertical location of the related end of the cam member may be adjusted.

Each cam element 120 has a lower cam surface 120C that, as shown in Figs. 5 and 6, has a curved form, and this downwardly facing cam surface 120C is arranged to be engaged by a roller 125 mounted on the adjacent arm 101 by means of a stud 125S as shown in Fig. 11. Thus, as the cam roller P is moved through its printing stroke, the rollers 125 are maintained in engagement with the cam surface 120C and this cam surface is formed, as shown in Figs. 5 and 6, so that the platen roller P will move through a straight line movement and will produce printed impressions from each of the type characters that lies in the printing plane.

Figure 2:
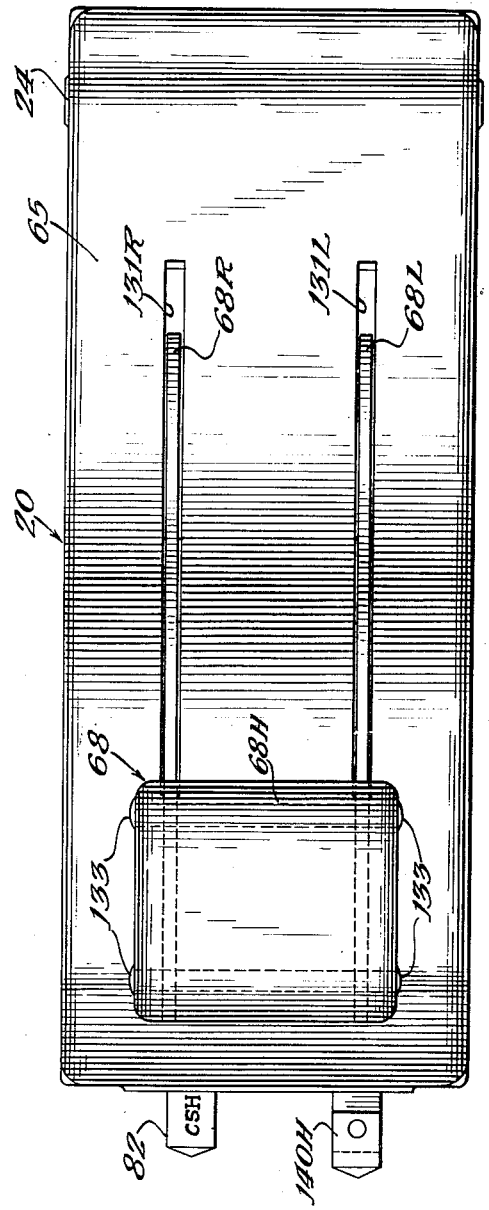
Fig. 2 is a plan view of the machine shown in Fig. 1.

As hereinabove pointed out, the desired rocking movements of the rocker structure 110 are obtained through actuating movements of the handle 68. Thus, the handle 68 is in the present instance afforded by a pair of curved plate-like members 68R and 68L that are pivotally mounted on the cross shaft 53 and are held in spaced relation on the cross shaft 53 by spacer sleeves 130. The handle members 68R and 68L extend upwardly through clearance slots 131R and 131L that are formed in the casing 65, and the outer ends of these arms 68R and 68L extend toward the forward end of the casing 65. Between the forward ends of the arms 68R and 68L, a relatively wide and flat block-like member 68H is extended, as shown in Figs. 2, 3 and 4, and the mounting of the cross member 68H is attained by forming slots 132 in the lower face of the member 68H so that these slots may embrace forward end portions of members 68R and 68L. The cross member 68H is held in position by a pair of pins 133 that are extended transversely through the member 68H and through appropriate openings in members 68R and 68L.

Somewhat above the shaft 53, the members 68R and 68L are connected by a cross pin 134, as will be evident in Figs. 5 and 6 of the drawings, and a coil spring 135 acting between the cross pin 134 and the cross pin 52 acts normally to urge the handle 68 about its pivotal axis 53 and into the retracted relationship that is shown in Figs. 1 and 6 of the drawings. The spring 135 is relatively strong so that when the handle 68 is pulled forwardly and downwardly from the position shown in Figs. 5 and 6, the torsion spring 60 is first overcome and the printing head H is moved from the retracted relationship shown in Fig. 6 to the lower or effective relationship shown in Fig. 1 of the drawings. When the printing head H is thus moved to its lower position, it may be latched in its lower position by means including a downwardly extending hook 137 that is fixed on the inner face of the side plate 48R so as to project downwardly therefrom as shown in Fig. 6 of the drawings. When the printing head H is in this lower position, the hook or shoulder 137S indicated in Fig. 6 of the drawings is located just below the level of a laterally projecting arm 140A that is formed on a horizontally shiftable latch member 140. This latch member 140 is slidably mounted in the forward right-hand portion of the platform 22 as best shown in Figs. 8 and 9 of the drawings, a retaining plate 141 being disposed in position over the latch member 140. The latch member 140 has a pair of notches 142 formed in its upper face, and a resilient retaining spring 143, secured by rivets 144 on the plate 141, may be engaged with either one of the notches 142 so as to hold the latch in a released position or in an effective position, the latch 140 being shown in its effective relationship in Figs. 8 and 9 of the drawings. It will be recognized, of course, that the latch member 140 must be manually moved between its two positions and this may be accomplished by grasping an enlarged operating head 140H that is secured on the forward end of the latch member 140.

The desired operating connection between the handle elements 68R and 68L and the rocking frame 110 is attained by locating the handle elements 68R and 68L in the planes of the respective rocker arm elements 110R and 110L. Thus, the rocker arm elements have gear segments 145R and 145L formed respectively thereon so as to face generally toward the shaft 53, and the handle elements 68R and 68L have opposing gear segments 146R and 146L formed thereon. The gear segments 145R and 146R are meshed with each other, and the same is true with respect to segments 145L and 146L, so that when the handle 68 is moved from a full line position of Fig. 1 to the full line position shown in Fig. 5, the platen supporting structure is rocked from the normal rear position that is shown in dotted lines in Fig. 1 to the forward end position that is shown in full lines in Fig. 5 and in dot and dash lines in Fig. 1. The limit of such movement is in the present instance determined by the engagement of a pair of shoulders 148 formed on the handle members 68R and 68L with a pair of abutment surfaces 149 formed on the rocker elements 110L and 110R. Upon release of the downward pressure upon the handle 68, the spring 135 serves to return the platen structure to its rear position, the handle 68 returning, of course, to the relationship shown in the full lines of Fig. 1. In the event that the latch 140 is at this time released, the torsion spring 60 will therefore become effective to return the printing head H to its retracted relationship of Fig. 6.

Under and in accordance with the present invention, the inked ribbon IR is arranged so that it may be readily and easily replaced when it is desired, and in such replacement, the newly mounted ribbon mechanism becomes operatively associated with the ribbon actuating and reversing mechanism that remains permanently in position within the printing head H. Thus the carrier C which removably supports the ribbon IR within the printing head is best shown in Figs. 13 and 14 of the drawings. The carrier C comprises a pair of elongated and relatively narrow side frames 150R and 150L that are rigidly inter-connected by a pair of cross rods 151. The cross rods 151 are arranged to act as guide elements for the ribbon IR so that the ribbon will be stretched across the area in which printing is to take place. At its opposite ends, and beyond the cross rods 151, the carrier C is provided with means for supporting ribbon spools 152, the mechanism being substantially the same at each end of the carrier C. Thus with respect to the forward end of the carrier C, it will be observed that a rotative stud 153 is extended through side plate 150R, and on its inner end the stud has a positioning plate for disc 154 which may be engaged by the end of a spool 152 as it is slipped into position endwise into the inwardly projecting end of the stud 153. The stud 153 has a cross pin 155 therein which in such circumstances will be engaged with notches that are conventionally formed in the end edges of such ribbon spools. Outside of the side plate, the stud 153 has a ratchet wheel that may be engaged by suitable ribbon drive mechanism, as will hereinafter be described. The ratchet wheel that is associated with the forward stud 153 is in the present instance identified as 156F, and the teeth of the ratchet wheel are so formed that they may be engaged on the upper edge of the ratchet wheel with a rearward motion so as to wind the ribbon by a counter-clockwise rotation of the spool, as will be evident in Fig. 6 of the drawings. The stud 153 that is disposed adjacent the rear end of the side plate 150R is of a similar construction except that it is of what may be termed a reversive construction, and this ratchet wheel is identified as 156B in Fig. 13 of the drawings. The teeth on this ratchet wheel 156B are so formed that the upper edge of the ratchet wheel may be engaged and moved in a forward direction, thereby to impart winding movements to an associated spool in a clockwise direction. The opposite or left-hand ends of the spools 152 are supported by what may be termed retractable studs 160 which, as shown in Figs. 13 and 14, are mounted on opposite ends of a flat spring member 161, such spring member being secured on the outer surface of the side plate 150L by means indicating rivet 162. The studs 160 project from the mounting spring 161 and through elongated clearance openings 164 that are formed in the side plate 150L.

When a ribbon is to be mounted in the carrier C, one of the studs 160 is retracted by engagement and outward bending of the adjacent end of the spring arm 161, and the spool is then put in place on stud 153, after which the spring 161 is released so that the tapered and reduced end portion 160R on the stud moves into position within the adjacent end of the spool 152. A similar mounting operation is then performed with respect to the other ribbon spool.

After the ribbon has been mounted on the carrier C, such carrier may readily be put into position within the printing head H of the machine, and to enable this to be accomplished, the opposite ends of the side plates 150R and 150L are formed for cooperation with the stationary elements within the printing head H to locate the carrier C in a predetermined position within the head. Thus, as will be evident in Fig. 14 of the drawings, the rearwardly projecting ends of the side frame members 150R and 150L have tapered positioning notches 167 formed therein, and these notches 167 are adapted to move rearwardly into embraced relationship with respect to cross shaft 51 of the printing head. This cross shaft 51, as shown in Figs. 6 and 7, is formed with annular grooves 168 therein so that the reduced portions of the cross shaft 51, as afforded by these grooves, will be snugly embraced by the innermost portions of the slots 167 when the carrier has been moved as far rearwardly as possible within the head H. Thus, the engagement of the slots 167 with the annular groove 168 serves to position the rear end of the carrier both laterally of the printing head H as well as vertically. The forward end of the carrier C is then moved into proper relationship with respect to the forward portion of the printing head H and to enable this to be done the side plates 150R and 150L have upward projections 170 as shown in Figs. 6 and 14. In the upper ends of the projections 170, slots 171 are formed, as will be evident in Fig. 14. This slot is so formed as to in effect be centered upon the bottom portions of the slots 167. Hence, after the rear end of the carrier C has been moved into the desired relationship with respect to the cross shaft 51, the forward end of the carrier may be moved upwardly, and in such movement the upwardly facing slots 171 move into engagement with the annular grooves 174 that are formed in the cross shaft 55. When the slots 171 move into firm engagement with the bottoms of the grooves 174, means are effective to latch the forward end of the carrier C in its upper or effective position. Such means, as herein shown, are afforded by a rocker structure 175 that is pivoted on the cross shaft 55. This rocker structure includes right and left-hand bell crank levers 175R and 175L that are pivoted on the shaft 55 and are connected by a cross bar 176 adjacent the lower ends thereof. This cross bar 176 is arranged, when the carrier C is in its upward or fully inserted position, to engage forwardly facing notches 177, Fig. 14, that are formed in the forward ends of the side frame plates 150R and 150L. Each bell crank arm 175R and 175L has a spring 179 acting on its upper rear end so as to normally urge the rocker structure 175 toward its latching position in which it is shown in Fig. 6 of the drawings. When it is desired to release and remove the carrier C, it is merely necessary to engage the conveniently located latch bar 176 and move the same forwardly so as to disengage the latch bar 176 from the notches 177. The carrier C then drops downwardly about the remaining pivotal support that is supported by the engagement of the slots 167 with the cross bar 51, and when the carrier has moved down to a position where it is substantially parallel to the platform 22, the carrier may be withdrawn in a forward direction so as to disengage the same from the cross shaft 51. Another carrier C with a new ribbon IR thereon may then be mounted in position in the printing head, as hereinbefore described.

When the carrier C is in the operative position in which it is shown in Figs. 4 and 5, it is so located that the ratchet wheels 156F and 156B are in position for cooperation with the ribbon advancing and reversing means. Such ribbon advancing and reversing means are mounted on the inner surface of the side plate 48R and in attaining such mounting, a pair of stationary mounting studs 180 are extended inwardly from the side plate 48R. These studs serve as supports for a pawl carrying bar 181 as well as a control or reversing slide 182. Thus, the reversing slide 182 is in the present instance formed with a pair of guide slots 182S that surround guiding portions of the studs 180 immediately adjacent to the inner surface of the side plate 48R. The pawl carrier 181 is similarly provided with elongated guide slots 181S that engage somewhat larger portions of the supporting studs 180, as will be evident in Fig. 7 of the drawings. The plates 181 and 182 may thus be reciprocated in a direction which is parallel to the lower edge of the side plate 48R, and such reciprocating movement of the two plates normally take place in unison, but, as will hereinafter be described, the relative position of the two plates 181 and 182 may be changed in order to cause reversal of the ribbon advancing movements.

Thus, the pawl carrier 181 is provided, adjacent to its opposite ends, with a pair of reversely disposed actuating pawls 185F and 185B, and these pawls are pivoted on the pawl carrier 181 by pivots 186F and 186B. The pawl 185F is adapted for cooperation with the forward ratchet wheel 156F, and a spring 187F acting on what may be termed the tail portion of the pawl 185F normally urges pawl 185F toward an effective relationship with respect to the ratchet wheel 156F. The spring 187F is anchored at its upper end on a pin 188F that is carried on the control plate 182, and this pin 188F is arranged so that it may be disposed in a position where it will hold the pawl 185F in its retracted or ineffective position in which it is shown in Fig. 5. The pawl 185B is arranged for cooperation with the ratchet wheel 156B, and a spring 187B acts between the tail portion of the pawl 185B and a pin 188B on the control plate 182 so as to urge the pawl 185 toward its effective position.

The control plate 182 is adapted to dispose any one of two different relationships with respect to the pawl carrier 181. In its left-hand position, as shown in Fig. 5 of the drawings, the control plate is effective to engage the pin 188F with the pawl 185F to render this pawl 185F ineffective. When the plate 182 is shifted to the right with respect to the pawl carrier 181, the pin 188B renders the pawl 185B ineffective, and the pawl 185F is released for movement to its effective relationship. The control plate 182 is maintained in either one or the other of these two relationships with respect to the pawl carrier 181 by a retaining or detent pawl 190 that is pivoted on the control plate 182 and is urged by a spring 191 toward the lower edge of the pawl carrier 181. The lower edge of the pawl carrier 181 has a pair of notches 192 formed therein so that the detent pawl 190 may engage at one or the other of these notches to maintain the control plate 182 in one or the other of its two relationships with respect to the pawl mounting member 181.

It will be noted in Fig. 5 of the drawings that the control plate 182 has a rearwardly projecting arm 182B that is adapted in reciprocation of the connected plates 181 and 182 to engage the coil of ribbon that is wound on the rear spool 152. Similarly, an arm 182F on the forward end of the control plate 182 is arranged for engagement with the coil ribbon that is wound on the forward spool 152. When the coil becomes too large on one of the spools, the operating forces applied as hereinafter will be described, to pawl carrier 181 are effective to move the pawl carrier 181 with respect to the control plate 182, thereby to shift the control plate with respect to the pawl carrier and thus produce a ribbon reversing operation.

The desired reciprocating movements are applied to the pawl carrier 181 as an incident to the desired shifting movements of the printing head H. Thus, an operating lever 195 is pivoted on a cross shaft 51 and is extended upwardly so that a slot 195S in the operating lever 195 may embrace a transversely extending pin 196 that is mounted on the pawl carrier 181. A spring 197 acts between an upper end portion of the lever 195 and anchoring pin on the side plate 48R to urge the lever 195 in counterclockwise direction, as viewed in Fig. 6, thereby normally to tend to move the pawl carrier yieldingly in a rearward direction. Below the cross shaft 51, the lever 195 has a curved and downwardly extending tail portion 195T that is arranged to engage a laterally projecting pin 198 that is mounted in a fixed position on the side of the column 42 and somewhat forwardly of the pivot shaft 24. The relationship is such that when the printing head H is rocked in a downward direction from the position of Fig. 6 to the position shown in Fig. 5, the lever 195 is rocked in a clockwise direction, as will be evident from a comparison of Figs. 5 and 6. This moves the pawl carrier 181 in a forward direction against the action of the return spring 197, and when the ribbon reversing or control plate 182 is set in relationship shown in Figs. 5 and 6, this will impart a ribbon advancing movement to the rear spool 152. Under such circumstances, when the printing head H is released for its upward or retracting movement to the position of Fig. 6, the return movement of the lever 195 to the position of Fig. 6 will merely produce an idle return movement of the pawl carrier 181. When the ribbon reversing mechanism is set in its other relationship, the ribbon advancing movement will be accomplished in the opposite direction by the pawl 185F, and this will take place, not in the downward movement of the printing head H, but in the upward or return movement thereof.

From the foregoing description it will be apparent that the present invention affords a sales slip imprinter that is simple in structure and in which the manufacture, assembly and service operations may be easily and economically performed.

It will also be evident that under the present invention the way in which the ribbon feed mechanism is actuated is materially simplified, and the inked ribbon may be quickly and easily removed and replaced. Furthermore, the present invention enables the inked ribbon in such a machine to be mounted upon a removable ribbon carrier so that such ribbon carrier may be readily removed and may be replaced upon a different ribbon carrier so that the task of replacing the ribbon in such a machine may be quickly and easily accomplished.

It will also be apparent from the foregoing description that the present invention enables the printing forces applied by the platen roller to be accurately controlled so as to thereby insure an even and neat printed impression. More specifically, it will be clear that the present invention affords a guide means for the platen rollers that are of a simple character so as to enable curved cam surfaces thereof to be effective for obtaining a straight line path for the travel of the platen roller.

It will also be apparent that the present invention simplifies the mounting of the anvil in such sales slip imprinting machines, and that a stationary mounting for the anvil is afforded in fixed relationship with respect to the supporting platform while the desired relationship between the platen roller and the anvil may be attained through the adjustment of guide means that are afforded in the printing head of the machine.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a sales slip printing apparatus, a base having a platform across the upper face of which a sales slip may be disposed for performance of a printing operation, means on said platform for removably holding a printing device from which a printed impression is to be made onto a sales slip, a printing head having a lower face and pivotally mounted on an axis located transversely of one end of said platform for movement from an out-of-the-way position, which exposes the upper face of said platform, to an operative position over and in an opposed relation to the upper face of said platform, an elongated pawl carrier mounted within said head for reciprocation parallel to said lower face, downwardly and reversely disposed pawls pivoted on said pawl carrier at spaced points, a control plate mounted adjacent to and for normal reciprocation with said pawl carrier, detent means for yieldingly maintaining said control plate in one or the other of two positions with relation to said pawl carrier, means on said control plate effective to selectively disable said pawls in accordance with the position of said plate in respect to said pawl carrier, means operable as an incident to shifting movements of said head to reciprocate said pawl carrier, a removable ribbon carrier having a pair of spool supporting means including oppositely disposed ratchet wheels, and means for releasably supporting said ribbon carrier in the lower portion of said head with said ratchet wheels operatively related with respect to said pawls.

2. In a sales slip printing apparatus, a base having a platform across the upper face of which a sales slip may be disposed for performance of a printing operation, means on said platform for removably holding a printing device from which a printed impression is to be made onto a sales slip, a printing head having a lower face and pivotally mounted on an axis located transversely of one end of said platform for movement from an out-of-the-way position, which exposes the upper face of said platform, to an operative position over and in an opposed relation to the upper face of said platform, an elongated pawl carrier mounted within said head for reciprocation parallel to said lower face, downwardly and reversely disposed pawls pivoted on said pawl carrier at spaced points, a control plate mounted adjacent to and for normal reciprocation with said pawl carrier, detent means for yieldingly maintaining said control plate in one or the other of two positions with relation to said pawl carrier, means on said control plate effective to selectively disable said pawls in accordance with the position of said plate in respect to said pawl carrier, a lever crank pivoted in said head and having a pin and slot connection with said pawl carrier, a pin mounted on said base and engageable by said lever when said head is shifted to reciprocate said pawl carrier, and a removable ribbon carrier having a pair of spool supporting means including oppositely disposed ratchet wheels, and means for releasably supporting said ribbon carrier in the lower portion of said head with said ratchet wheels operatively related with respect to said pawls.

3. In a sales slip imprinting apparatus having a head movable from a raised non-printing position to a lowered printing position, a ribbon carrier mounted in the head comprising a pair of spaced side frame plates, a pair of ribbon guide members extended between said plates and securing said plates in rigid spaced relation, a pair of stub shafts rotatably mounted in one of said plates adjacent to the respective guide members, means on the inner end of each of said shafts for centering and drivingly engaging one end of a ribbon spool, a pair of oppositely disposed ratchet wheels fixed on the respective shafts on the outer side of said one plate, a spring bar anchored at its center on the outer face of the other plate and having its ends extended to points opposite and in alignment with the respective shafts, said other plate having clearance openings therein aligned with said shafts, supporting studs adapted to extend into and support the other ends of ribbon spools carried on said shafts, said studs being mounted on the respective ends of said spring bar so as to project through said openings past the inner face of said other plate and in alignment with said shafts, and means for driving said ratchets including a pawl carrier shiftably mounted in said head, pawls pivotally mounted at either end of said pawl carrier and each being in position to drivingly engage an associated ratchet as said pawl carrier is shifted, means in said head to shift said pawl carrier first in one direction as said head is lowered and then in the other direction as said head is raised, and means mounted in said head to hold one or another of said pawls disengaged as said carrier is shifted whereby said ribbon may be advanced in one direction only.

4. In a sales slip imprinting apparatus having a head movable from a raised non-printing position to a lowered printing position, a ribbon carrier comprising a pair of spaced side frame plates, a pair of ribbon guide members extended between said plates and securing said plates in rigid spaced relation, a pair of stub shafts rotatably mounted in one of said plates adjacent to the respective guide members, means on the inner end of each of said shafts for centering and drivingly engaging one end of a ribbon spool, a pair of oppositely disposed ratchet wheels fixed on the respective shafts on the outer side of said one plate, a spring bar anchored at its center on the outer face of the other plate and having its ends extended to points opposite and in alignment with the respective shafts, said other plate having clearance openings therein aligned with said shafts, supporting studs adapted to extend into and support the other ends of ribbon spools carried on said shafts, said studs being mounted on the respective ends of said spring bar so as to project through said openings past the inner face of said other plate and in alignment with said shafts, said plates having slots opening endwise at one end of the carrier and opening upwardly at the other end of the carrier for positioning the carrier in a sales slip imprinting apparatus, and means for driving said ratchets including a pawl carrier shiftably mounted in said head, pawls pivotally mounted at either end of said pawl carrier and each being in position to drivingly engage an associated ratchet as said pawl carrier is shifted, means in said head to shift said pawl carrier first in one direction as said head is lowered and then in the other direction as said head is raised, and means mounted in said head to hold one or another of said pawls disengaged as said carrier is shifted whereby said ribbon may be advanced in one direction only.

5. In sales slip imprinting apparatus having a head movable from a raised non-printing position to a lowered printing position, a ribbon carrier comprising a pair of spaced side frame plates, a pair of ribbon guide members extended between said plates and securing said plates in rigid spaced relation, a pair of stub shafts rotatably mounted in one of said plates adjacent to the respective guide members, means on the inner end of each of said shafts for centering and drivingly engaging one end of a ribbon spool, a pair of oppositely disposed ratchet wheels fixed on the respective shafts on the outer side of said one plate, said other plate having clearance openings therein aligned with said shafts, supporting studs adapted to extend into and support the other ends of ribbon spools carried on said shafts, a means movably supporting said studs so as to project through said openings past the inner face of said other plate and in alignment with said shafts, and means for driving said ratchets including a pawl carrier shiftably mounted in said head, pawls pivotally mounted at either end of said pawl carrier and each being in position to drivingly engage an associated ratchet as said pawl carrier is shifted, means in said head to shift said pawl carrier first in one direction as said head is lowered and then in the other direction as said head is raised, and means mounted in said head to hold one or another of said pawls disengaged as said carrier is shifted whereby said ribbon may be advanced in one direction only.

6. In a sales slip printing apparatus a platform across the upper face of which a sales slip may be disposed, and means on said platform for removably receiving and positioning a printing device from which a printed impression is to be made onto a sales slip, means at one end of said platform providing a pivotal mounting axis extending transversely across and parallel to said upper face of said platform, a printing head mounted at one of its ends on said axis for movement from an upper out-of-the-way position wherein the other end of said head is spaced from said platform and which position exposes the upper face of said platform, to an operative position downward over and in an opposed relation to the upper face of said platform, a ribbon advancing and reversing means mounted within said head and including a pair of spaced downwardly facing actuating pawls for advancing said ribbon in one direction or the other, a removable ribbon and spool carrier comprising a pair of spaced side plates removably mounted in a latched position within said head, oppositely disposed ratchet wheels mounted in said carrier to be operated by said pawls to advance said ribbon between the spools in the carrier, means for operating only one of said pawls at a time including a pawl carrier plate shiftably mounted in said head and having said pawls arranged at either end thereof, said pawl carrier being under control of a cam means operated by said head as the latter is moved between said positions therefor to move the pawl carrier first in one direction and then the other, a control plate shiftably associated with said pawl carrier and adapted to move in unison with the latter under the control of the cam means, said control plate having two different shift positions with respect to said carrier to hold one or the other of the pawls inoperative at such different positions, and means on said control plate to determine when one or the other ribbon spool is full and to thereupon shift the control plate to one or the other of said two different positions to thereby reverse the ribbon feed.

7. In a sales slip printing apparatus a platform across the upper face of which a sales slip may be disposed, and means on said platform for removably receiving and positioning a printing device from which a printed impression is to be made onto a sales slip, means at one end of said platform providing a pivotal mounting axis extending transversely across and parallel to said upper face of said platform, a printing head mounted at one of its ends on said axis for movement from an out-of-the-way position wherein the other end of said head is spaced upwardly from said platform and which position exposes the upper face of said platform, to an operative position over and in an opposed relation to the upper face of said platform, said head comprising a pair of side plates connected by a plurality of transversely extended spacer rods, means for feeding out an inked ribbon below said platen roller and above the printing anvil, the last-named means including a pair of spaced actuating pawls mounted in said head for advancing said ribbon in one direction or the other, a removable ribbon and spool carrier comprising a pair of spaced side plates, rigid ribbon guides connecting said side plates, a pair of rotatable spool supporting and driving shafts on one of said plates for respectively supporting one end of a pair of ribbon spools, oppositely disposed ratchet wheels on said shafts to be operated by said pawls to advance said ribbon, means on the other plate for releasably engaging and supporting the other ends of such a pair of ribbon spools, said carrier side plates having notches at either end thereof for embracing said spacer rods, and means including a manually releasable latch located on said head adjacent to said other end for releasably supporting said carrier in the lower portion of said head with said ratchet wheels operatively related with respect to said pawls and said notches embracing said spacer rods.

8. In a sales slip printing apparatus, a base having a platform across the upper face of which a sales slip may be disposed for performance of a printing operation, means on said platform for removably receiving and positioning a printing device from which a printed impression is to be made onto a sales slip, means at one of said platform providing a pivotal mounting axis extending transversely across and parallel to said upper face of said platform, a printing head mounted on said axis for movement from an out-of-the-way position, which exposes the upper face of said platform, to an operative position over and in an opposed relation to the upper face of said platform, said head comprising a pair of side plates and a plurality of transversely extended spacer rods connecting said side plates, an operating handle mounted on said head for imparting movement to said printing head a removable ribbon and spool carrier comprising a pair of spaced carrier plates, rigid ribbon guides connecting said carrier plates, a pair of rotatable spool supporting and driving shafts on one of said carrier plates for respectively supporting one end of a pair of ribbon spools, said carrier plates having mounting notches at one end thereof for engagement with one of said spacer rods to support one end of said carrier in the lower portion of said head with said ribbon disposed between the platen roller and said anvil, and the other ends of said carrier plates having upwardly facing notches therein for engaging another of said spacer rods, and latch means in said head for engagement with said carrier plates adjacent said last mentioned notches to releasably support said carrier in the lower portion of said head with said ratchet wheels operatively related with respect to said pawls.

9. In a sales slip printing apparatus, a base having an elevated platform across the upper face of which a sales slip may be disposed for performance of a printing operation, means on said platform for removably receiving and positioning a printing device from which a printed impression is to be made onto a sales slip, means at one end of said platform providing a pivotal mounting axis extending transversely across and parallel to said upper face of said platform, a printing head mounted on said axis for movement from an out-of-the-way position, which exposes the upper face of said platform, to an operative position over and in an opposed relation to the upper face of said platform, ribbon advancing and reversing means mounted within said head and including a pair of spaced downwardly facing actuating pawls, a ribbon and spool carrier mounted in said head and having a pair of spool supporting means including oppositely disposed ratchet wheels related to said pawls for advancing said ribbon between the spools in one direction or the other, means for operating said pawls including a reciprocal pawl carrier in said head mounting said pawls, means mounted in said head to move said reciprocal pawl carrier first in one direction and then the other accordingly as said head is moved between the said positions therefor, and a control plate to reverse the direction of ribbon travel, said plate being associated with said pawl carrier so as to reciprocate therewith, means at either end of said control plate to engage a corresponding pawl and dispose the same in a position inoperative to feed the ribbon, and means under control of the thickness of the ribbon on the ribbon spools to actuate said control plate relative to said pawls to thereby reverse the ribbon feed as the control plate and pawl carrier reciprocate together.

10. In a printing apparatus, a base having a platform across the upper face of which an article to be printed may be disposed for performance of a printing operation, means on said platform for removably receiving and positioning a printing device from which a printed impression is to be made onto said article from an inked ribbon, means at one end of said platform providing a pivotal mounting axis extending transversely across and parallel to said upper face of said platform, a printing head mounted on said axis for movement from an out-of-the-way position, which exposes the upper face of said platform, to an operative position over and in an opposed relation to the upper face of said platform, said head comprising a pair of side plates and ribbon advancing and reversing means mounted on one of said side plates within said head and including a reciprocally mounted pawl carrier on which is mounted a pair of spaced downwardly facing actuating pawls, a ribbon and ribbon spool carrier including a pair of rotatable spool supporting and driving shafts for respectively supporting a corresponding pair of ribbon spools, oppositely disposed ratchet wheels fixed on said shafts in position opposite said pawls to be driven thereby, a control plate for controlling the direction of ribbon feed, said control plate being adapted in one position with respect to said pawl carrier to hold one of the pawls inoperative and adapted in another such position to hold the other pawl inoperative, means in said printing apparatus to reciprocate the pawl carrier as the printing head is lowered and then raised to cause the operative one of the pawls to rotate the corresponding ratchet wheel, and means in the printing head responsive to the thickness of the ribbon on the spools to place said control plate in one or the other of the said positions therefor.

11. In a printing apparatus, a base having an elevated platform across the upper face of which an article to be printed may be disposed for performance of a printing operation, means on said platform for removably receiving and positioning a printing device from which a printed impression is to be made onto the article, a printing head mounted on said platform for movement from an out-of-the-way position, which exposes the upper face of said platform, to an operative position over and in an opposed relation to the upper face of said platform, a ribbon advancing and reversing means mounted within said head and including a pawl carrier at either end of which is mounted a downwardly facing actuating pawl, a ribbon and spool carrier having a pair of oppositely disposed ratchet wheels, one of which is adapted to be engaged by one of said pawls while the other of said pawls is disposed in an inoperative position with respect to the other of the ratchet wheels, means for supporting said ribbon and spool carrier in the lower portion of said head with said ratchet wheels related with respect to said pawls for advancing said ribbon in one direction or the other accordingly as one or the other ratchet wheel is engaged by a pawl, and means for reversing the direction of ribbon feed by changing the ratchet that is engaged by a pawl, the last-named means including a control plate shiftably related to said pawl carrier between positions wherein the control plate is effective to hold one but not the other pawl inoperative.

12. In a printing apparatus, a base having an elevated platform across the upper face of which an article to be printed may be disposed for performance of a printing operation, means on said platform for removably receiving and positioning a printing device from which a printed impression is to be made onto such an article, a printing head mounted at one end of said platform for movement from an out-of-the-way position, which exposes the upper face of said platform, to an operative position over and in an opposed relation to the upper face of said platform, ribbon advancing and reversing means mounted within said head and including a pawl carrier at either end of which is mounted a downwardly facing actuating pawl, said pawl carrier being mounted in said head for shifting movement between limit positions, a ribbon and spool carrier mounted in said head and having a pair of spaced rotatable spool supporting means respectively including oppositely disposed ratchet wheels one of which is adapted to be engaged by one of said pawls during shifting movement of said pawl carrier while the other pawl is held in an operative position with respect to the other of said ratchet wheels, means in said head for shifting said pawl carrier first to one limit position and then to the other limit position as said head is moved between said positions therefor, and means for changing the ratchet that is engaged by a pawl, the last-named means including a control plate shiftably related to said pawl carrier between two opposite positions wherein the control plate is effective to hold one but not the other pawl inoperative, and means on the control plate responsive to the thickness of ribbon on the spools to place said control plate in one or the other of said opopsite positions therefor to change the direction of ribbon feed.

References Cited in the file of this patent

UNITED STATES PATENTS

| Number | Name | Date |
|---|---|---|
| 1,141,191 | Kirkman | June 1, 1915 |
| 1,228,928 | Joehrendt | June 5, 1917 |
| 1,928,685 | Dugdale | Oct. 3, 1933 |
| 1,971,568 | Kranz | Aug. 28, 1934 |
| 2,004,801 | Sheppard | June 11, 1935 |
| 2,026,115 | Anthony | Dec. 31, 1935 |
| 2,068,707 | Readon | Jan. 26, 1937 |
| 2,176,371 | Wahl | Oct. 17, 1939 |
| 2,295,748 | Moore | Sept. 15, 1942 |
| 2,297,541 | Dugdale | Sept. 29, 1942 |
| 2,435,542 | Linn et al. | Feb. 3, 1948 |